United States Patent [19]

Merritt et al.

[11] E Patent Number: Re. 32,469

[45] Reissued Date of Patent: Aug. 11, 1987

[54] SIDE POCKET MANDREL

[75] Inventors: David T. Merritt, Celina; David W. Fish, Carrollton; Olen R. Long, Celina, all of Tex.

[73] Assignee: Otis Engineering Corporation, Dallas, Tex.

[21] Appl. No.: 724,471

[22] Filed: Apr. 17, 1985

Related U.S. Patent Documents

Reissue of:

[64] Patent No.: 4,416,330
Issued: Nov. 22, 1983
Appl. No.: 350,283
Filed: Feb. 19, 1982

[51] Int. Cl.[4] ..... E21B 23/02

[52] U.S. Cl. ..... 166/117.5; 166/242; 166/372

[58] Field of Search ..... 166/117.5, 372, 242

[56] References Cited

U.S. PATENT DOCUMENTS

| | | | |
|---|---|---|---|
| 2,824,525 | 2/1958 | McGowen, Jr. | 116/117.5 X |
| 2,828,698 | 4/1958 | Bryan | 417/109 |
| 2,846,014 | 8/1958 | Daffin et al. | 166/102 |
| 4,271,902 | 6/1981 | Moore, Jr. | 116/117.5 |
| 4,498,533 | 2/1985 | Johnston | 166/117.5 |

FOREIGN PATENT DOCUMENTS

| | | | |
|---|---|---|---|
| 2142947 | 2/1973 | France | 166/117.5 |

*Primary Examiner*—James A. Leppink
*Assistant Examiner*—John F. Letchford
*Attorney, Agent, or Firm*—Albert W. Carroll

[57] ABSTRACT

A high-strength side pocket mandrel for high pressure service having a full-opening bore throughout its length but having a bore of keyhole shape above its receptacle bore to provide minimal but ample space for operation of a kickover tool for installing devices in the receptacle bore and providing strengthened walls for withstanding greater forces which would tend to burst or collapse the mandrel.

20 Claims, 7 Drawing Figures

SIDE POCKET MANDREL

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to gas lift apparatus for wells and more particularly to side pocket mandrels for use in gas lift wells.

2. Description of the Prior Art

Side pocket mandrels have long been used in wells for many years with good results, but as gas lift techniques are practiced at greater and greater depths in wells, demands for stronger side pocket mandrels increase.

Side pocket mandrels are necessarily somewhat bulbous in structure and have appreciable lateral area subjected to internal and external pressures which tend to rupture or collapse them, and they are not well suited to resist such forces acting upon them.

Further, many mandrels are used in wells equipped with dual tubing strings and, therefore, are flattened to a generally oval cross section to permit the passage of one mandrel past another in casing of reasonable size so that either such tubing string can be pulled from the well without disturbing the other tubing string. Flattened or oval cross-section mandrels are not as strong as round mandrels and will burst or collapse at lesser pressures.

Many mandrels have been equipped with means called deflectors or discriminators immediately above their receptacle bores to ward off most well tools lowered through the tubing to avoid their lodging in the mandrel, yet permit flow control devices to be installed in or removed from their receptacle bores through use of kickover tools using conventional wireline or pump-down (TFL) equipment and techniques. These accessories have been secured to the mandrel by welding. They have been expensive, and the welding has been a source of failure, especially where longitudinal structural welds or plug welds have been used. In some cases, wireline or tools have been damaged by or caused to lodge against such accessories and sometimes causing workover operations to be performed on a well.

In general, side pocket mandrels for use in wells where they may be subjected to severe pressure conditions where, for instance, the pressure external of the mandrel exceeds that internal thereof by as much as 10,000 to 15,000 psi or even more have been desired, but conventional structures did not lend themselves well to such rigid requirements since their size would be unduly large and require larger well casing.

U.S. patent application Ser. No. 148,928, filed May 12, 1980 by Robert S. Higgins and David T. Merritt for SIDE POCKET MANDREL AND METHOD OF CONSTRUCTION, [now allowed and] incorporated herein for all purposes, discloses a new side pocket mandrel structure and method of constructing the same whereby much stronger mandrels can be made. In this mandrel, all longitudinal structural welds and plug welds have been eliminated, thus eliminating a source of mandrel failure, however, the deflectors are welded to the inner wall of the mandrel (but not by structural welds). The present invention is an improvement over the just-mentioned invention of Higgins and Merritt, Ser. No. 148,928. In the present invention, deflectors have been eliminated altogether and in such manner that the side pocket mandrel is made much stronger both in burst strength and in collapse strength, and its cost of construction has not particularly been increased.

A search of the prior art was made, and the following U.S. patents were found:

| | | |
|---|---|---|
| 2,664,162 | 3,741,299 | 4,106,564 |
| 2,679,903 | 3,802,503 | 4,197,909 |
| 2,679,904 | 3,994,339 | 4,201,265 |
| 2,824,525 | 4,106,563 | 4,271,902 |
| 3,268,006 | | |

Also found, in addition to the U.S. application Ser. No. 148,928 of Higgins and Merritt, supra, was an advertisement in WORLD OIL magazine, Aug. 15, 1981 Edition, showing a side pocket mandrel which is of interest. The advertiser is McMURRY/HUGHES, Huntsville, Texas.

U.S. Pat. No. 4,271,902 which issued June 9, 1981 to Howard H. Moore, Jr. for SELF-DISCRIMINATING SIDE POCKET MANDREL AND METHOD OF MANUFACTURING SAME discloses a side pocket mandrel having a main passage through it and a receptacle bore extending alongside the main passage. A longitudinal groove is provided in the inner wall of the mandrel and extends upwardly from the receptacle bore to a point near the upper end of the mandrel to provide space above the receptacle for operation of a kickover tool for inserting a flow control device in the receptacle bore. This structure is fabricated by welding two slotted tubes together with their slots in communication with each other to form the main bore and groove configuration. This requires long longitudinal welds, one along either side of the mandrel, and longitudinal welds, as well as plug welds, in mandrels has been a source of failure as explained in the allowed application of Higgins and Merritt, Ser. No. 148,928, supra, now U.S. Pat. No. 4,333,527 of which this present invention is an improvement.

The advertisement of McMurray/Hughes in WORLD OIL Magazine, Aug. 15, 1981 Edition, shows a cross-sectional view of a side pocket mandrel which, at first, appears to be pertinent to this case, but the description which accompanies the view makes it appear that the mandrel is constructed approximately as taught in U.S. Pat. No. 4,271,902, mentioned above, in that it is formed by joining two separate tubes together. This would require two longitudinal welds, one on either side of the mandrel, and such welds are a known source of mandrel failure.

U.S. Pat. No. 2,824,525 to McGowen shows a cross-sectional view which provides a main passage and a groove in the wall thereof, but the groove is not for operating a kickover tool, and it does not extend above the receptacle. Also, longitudinal welds are seen at W2 in FIGS. 4 and 5 and at W1 in FIG. 6.

U.S. Pat. No. 3,268,006 to Hayes shows a guide extending a short distance above the receptacle bore of a side pocket mandrel. The groove provided by this guide is of a different width for each mandrel in the tubing string with the narrowest groove in the uppermost mandrel and the widest groove in the lowermost mandrel. Rings of different sizes may be used on the kickover tool to thus provide a selectivity whereby a flow control device may be installed in a selected one of a plurality of such side pocket mandrels in a single string of well tubing.

U.S. Pat. Nos. 2,664,162 and 2,679,904 to Howard et al. show mandrels with cross sections which may be of interest in that they have a main passage and groove configuration, but this groove-like configuration runs out a short distance above the receptacle. These mandrels are not for use with kickover tools which are kicked over mechanically but were to be used with installing tools which were lowered in the well on an electric line and forced laterally to one side by magnetic forces.

U.S. Pat. Nos. 3,741,299, 3,802,503, 4,106,564, 4,106,563, 4,197,908 and 4,201,265 show side pocket mandrels having guide means or deflectors above their receptacles which provide a short longitudinal groove, but these are welded into the body and are not formed integral therewith.

U.S. Pat. No. 3,994,339 discloses side pocket mandrels having bodies of oval section. Their walls appear to be of uniform thickness, and no groove extends above their receptacle. Any increase in strength is had because of their oval, or elliptical, or egg-shaped section.

None of the prior art found in the search or with which the applicants are familiar shows an upper body section welded by a circumferential weld to the main body section of a side pocket mandrel, the upper body section providing a main passage therethrough with a longitudinal groove in the inner wall of the main passage and extending from the receptacle bore upwardly virtually to connection means at the upper end thereof to provide space above the receptacle bore for operation of a kickover tool.

The present invention overcomes the problems and shortcomings discussed hereinabove by providing side pocket mandrels in which a longitudinal groove extends upwardly from the receptacle bore to substantially the connection means on the upper end of the mandrel, this upper body portion being of uniform section, its body wall thickened on either side of the groove in a manner which strengthens the body against forces which tend to either burst or collapse it. This uniform section is provided without longitudinal or plug-type structural welds, and production of this new side pocket mandrel is economical, its structure much stronger, and it fills a longfelt need for a side pocket mandrel for use at greater depths in deeper wells where they are subjected to greater forces which would tend to destroy the mandrel by bursting or collapsing the same.

SUMMARY OF THE INVENTION

The present invention, therefore, is directed to side pocket mandrels having means on their opposite ends for connection into a well tubing string to become a part thereof and comprising a main body section having a main bore therethrough and a receptacle bore extending alongside the main bore with port means communicating the receptacle bore with the exterior of the mandrel, and an upper body section welded to the upper end of the main body section with a circumferential weld and having a main passage therethrough aligned with the main bore of said main body section with an internal groove in the internal wall of the main passage extending from the receptacle bore upwardly substantially to the connecting means on the upper end of the mandrel, the internal groove being aligned with the receptacle bore and providing space above the receptacle bore for operation of a kickover tool for inserting a flow control device in the receptacle, said groove being narrower than the main bore and providing thicker walls on opposite sides of the groove, these thicker walls tapering in thickness toward opposite locations on a transverse plane where the axis of symmetry passes through the upper body section, thus providing a structure of great strength due to good distribution of stresses in the body wall.

It is therefore one object of this invention to provide an improved side pocket mandrel having an internal groove extending from the receptacle bore upwards to provide space above the receptacle bore for operation of a kickover tool.

Another object is to provide such a side pocket mandrel in which its groove is appreciably narrower than the tubing bore so that many well tools will be excluded therefrom while tools intended for entering such groove may readily do so.

Another object is to provide such an improved side pocket mandrel in which the groove allows the wall thickness of the mandrel to be thicker on opposite sides of the groove and tapering toward opposite locations on a transverse plane where the axis of symmetry passes through the upper body section to provide a body better able to withstand higher internal and external pressures.

Another object is to provide such a side pocket mandrel having a uniform cross section between the upper end of the receptacle bore and the connection means at the upper end of the mandrel.

A further object is to provide such a side pocket mandrel in which the just-mentioned portion of uniform cross section is formed by extrusion.

A further object is to provide such a side pocket mandrel in which only circumferential structural welds are used and no longitudinal structural welds or plug welds are used.

Another object of this invention is to provide such mandrels which are useful with orienting kickover tools which are used with conventional or pumpdown equipment and techniques.

Another object is to provide such side pocket mandrels which are economical to manufacture and yet have very good physical characteristics.

Other objects and advantages will become apparent from reading the description which follows and from studying the accompanying drawing wherein:

DESCRIPTION OF THE PREFERRED EMBODIMENTS

Figure 1A:
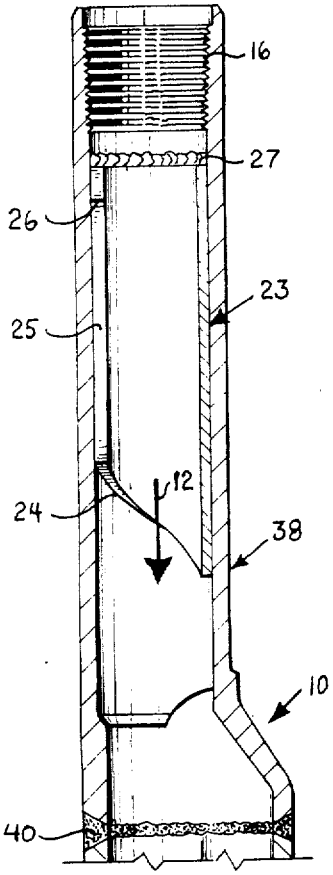
FIGS. 1A and 1B, taken together, constitute a longitudinal sectional view of one of the preferred embodiments of this invention showing a side pocket mandrel to be serviced with wireline tools.
Figure 2:
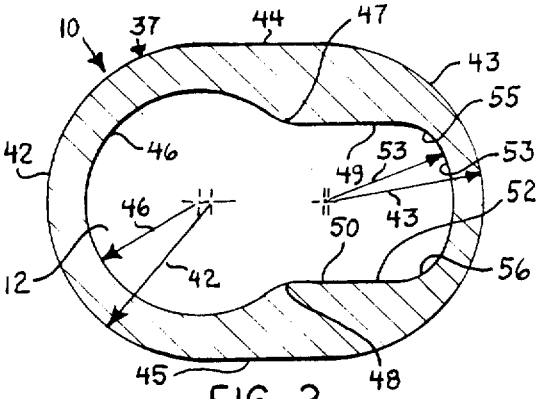
FIG. 2 is a cross-sectional view of enlarged scale taken along line 2—2 of FIG. 1B.
Figure 1B:
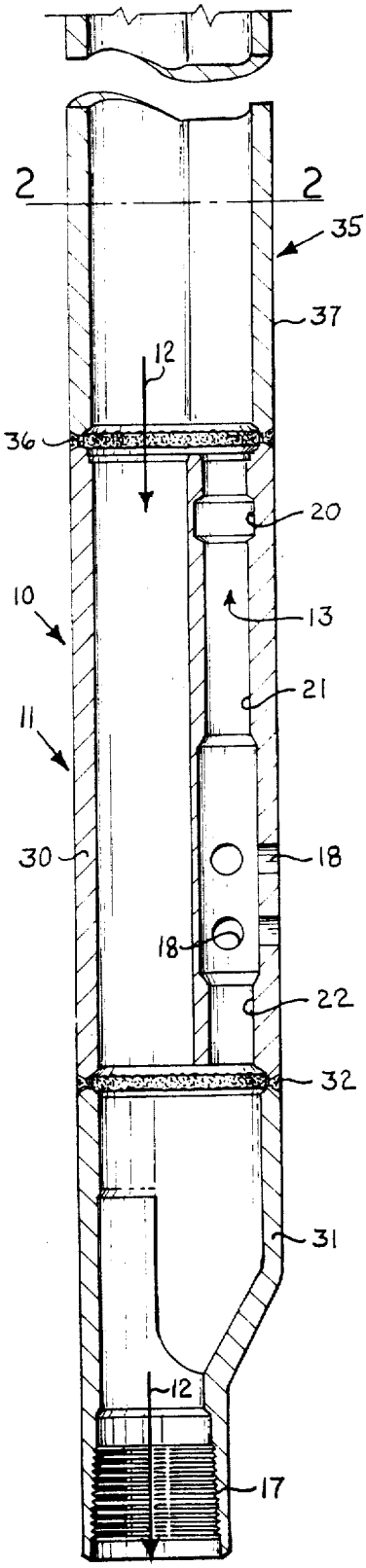

Referring now to FIGS. 1A, 1B and 2, it will be seen that there is illustrated a side pocket mandrel indicated generally by the numeral 10. Mandrel 10 possesses certain well-known features which are common characteristics of side pocket mandrels. For instance, mandrel 10 has an elongate body 11 having a full-opening main passage extending through its full length and indicated by the arrow 12, a receptacle bore 13 offset from the main passage, an offset belly or space above and in alignment with the offset receptacle 13 and means at each of its ends, such as the upper and lower internal threads 16 and 17 by which the mandrel is connectable in a string of well tubing to become a part thereof. Lateral port means such as ports 18 are provided to communicate receptacle bore 13 with the region exterior of the mandrel. The receptacle bore 13 is enlarged in the vicinity of ports 18 to provide ample passage for fluids, entering the mandrel through ports 18 to surround a flow control device (not shown) in the receptacle bore and flow into and through such flow control device in the usual and well-known manner. Such device (not shown) would be anchored in the receptacle bore 13 by lock means engaged in lock recess 20 and would carry seal means which would engage the wall of receptacle bore as at 21 and 22 above and below ports 18. Such flow control device is installed in or removed from such receptacle bore by means of a conventional wireline type kickover tool which is lowered into the side pocket mandrel through well tubing attached to its upper end and is activated to shift a portion thereof laterally into the space above receptacle bore 13 to align a handling tool carried thereby to a position of alignment with the receptacle bore 13. Such kickover tool is generally lowered into the well on a wire line or by pumpdown and a suitable tool string. Some kickover tools are kicked over by centralizer means, but many kickover tools are oriented to place the kickover arm on the same side as the receptacle and then activated to kickover position.

The side pocket mandrel 10 is intended for use with an orienting type kickover tool such as that illustrated and described in U.S. Pat. No. 3,876,001 to William B. Goode issued Apr. 8, 1975 for KICKOVER TOOL. For this reason, mandrel 10 is provided near its upper end with an orienting sleeve 23 having a guide surface 24 extending upwardly, preferably helically, to a longitudinal orienting slot 25 having a downwardly facing shoulder 26 at its upper end. The orienting sleeve is secured in the mandrel by welding as at 27. A suitable orienting kickover tool (not shown) would be lowered into the mandrel 10 until its oreinting key would be below the orienting sleeve 23 and then lifted. The orienting key would engage the guide surface 24 of the orienting sleeve, and cam action would rotate the kickover tool until the key would enter the orienting slot 25. Upon reaching the upper end of slot 25, the key would be stopped by downwardly facing shoulder 26, and further upward travel of the kickover tool would result in its activation.

The mandrel 10 is suitable for high pressure service and is preferably constructed in accordance with the methods claimed in U.S. application Ser. No. 148,928 of Higgins and Merritt which was earlier incorporated herein for references. It will be noticed that the body 11 of the mandrel 10 comprises a one-piece main body section 30 which has connection means such as thread 17 at its lower end. If desired, this connection means can be in the form of a lower end piece such as lower end piece 31 which is welded to the lower end of main body section 30 by a circumferential weld as at 32.

An upper body section 35 is welded to the upper end of main body section 30 by a circumferential weld as at 36. The upper end of the upper body section is provided with connecting means including internal thread 16. If desired, the upper body section 35 may be made of two portions such as an upper body member 37 and upper end piece 38 welded together with a circumferential weld as shown at 40. In this case, upper end piece 38 is clearly the connecting means and is threaded at 16. Upper body member 37 is of uniform section throughout its length. It may be machined, forged, extruded, milled or formed by other suitable means. In quantities, it is likely preferable to extrude it since this may be more economical.

FIG. 2 illustrates the preferred section for upper body member 37. The contour of the outer surface comprises equal semicircles 42 and 43 connected together by equal flat sides or straight lines 44 and 45. The contour of the inner wall resembles a keyhole, having a main bore 12 and a keyway-like longitudinal channel or groove formed in the wall of the main bore as shown and extending the full length of upper body member 37. This contour is defined by a long arc 46 of about ¾ of a circle connected by smaller arcs 47 and 48 to the side walls 49 and 50 of longitudinal groove 52 having a bottom 53. It is readily seen in FIG. 2 that the axis of symmetry passes through the centers of the four arcs 42, 43, 46, and 53. Side walls 49 and 50 of the groove are shown to be flat and parallel, but need not be so. They are spaced from the [axis] *plane* of symmetry to define the width of the groove. The bottom 53 of groove 52 is spaced from the main bore 12 a distance which may be termed the depth of the groove. The bottom of the groove is shown to be curved although it could be flat or concave, or elliptical, or semicircular, if desired. The corners where the sides 49 and 50 of the groove meet the groove bottom 53 are preferably rounded as at 55 and 56 to provide proper fillets to prevent stress risers at these points, that is, to better distribute stresses and avoid stress concentrations. In the design shown, the bottom corners of the groove are rounded with equal arcs, each having a radius equal to about half the radius of arcs 47 and 48. In any case, the width of groove 52 is less than the diameter of main passage 12.

Preferably, arc 42 does not have its center common with arc 46, but its center is located a little farther inward or closer to the center of the mandrel as is indicated by the arrows. This causes the wall of the mandrel to thicken in a direction away from the [axis] *plane* of symmetry and strengthens the mandrel considerably. In a similar manner, the centers for arcs 43 and 53 preferably do not coincide. If the center for arc 53 is located farther outwardly than is the center for arc 43, then the mandrel wall, here too, will thicken in a direction away from the [axis] *plane* of symmetry, strengthening the mandrel on the opposite sides of the groove 52. Thus, by blending the arcs forming the internal surfaces and the arcs and flats forming the external surfaces of the upper body member 37, there is provided a wall which is thickest on opposite sides of groove 52 and tapers toward opposite locations on a transverse plane where the [axis] *plane* of symmetry passes through the wall section. This provides the greatest strength where it is most needed, that is, in the area of the flat sides, and the wall then tapers in both directions as just explained and provides structural shape for efficiently distributing stresses in the mandrel wall, enabling the mandrel to withstand greater pressure forces which would tend to burst or collapse the same.

Groove 52 may be formed with its width and depth approximately equal. Preferably, its depth will exceed its width because this design provides a little added strength by providing a slightly heavier wall on either side of the groove.

The particular configuration shown in FIG. 2 was chosen because it provides good physical strength and can be produced by extrusion without exhorbitantly high cost.

In any case, the groove or channel 52 must be formed with sufficient width and depth for a kickover tool to operate therein and must be of sufficient width to freely receive gas lift valves or other devices to be inserted in the offset receptacle bore 13 therebelow, yet be sufficiently narrow to guard the receptacle bore against entrance of larger tools not intended to be inserted therein.

Figure 3A:
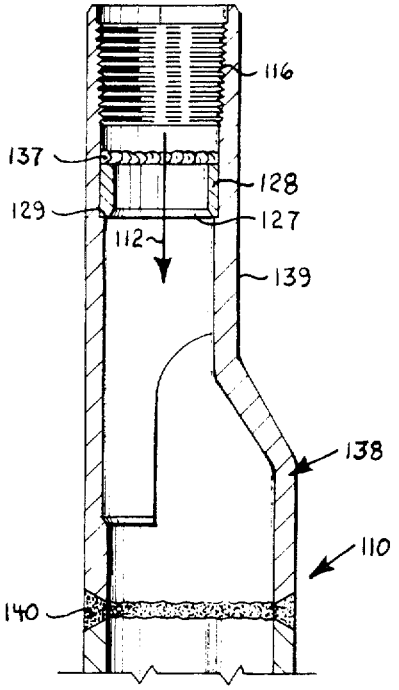
FIGS. 3A and 3B, taken together, constitute a longitudinal sectional view, similar to FIGS. 1A and 1B, but showing a side pocket mandrel intended for use in pumpdown wells.
Figure 4:
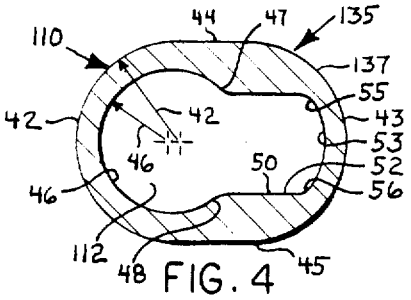
FIG. 4 is a cross-sectional view taken along line 4—4 of FIG. 3B.
Figure 3B:
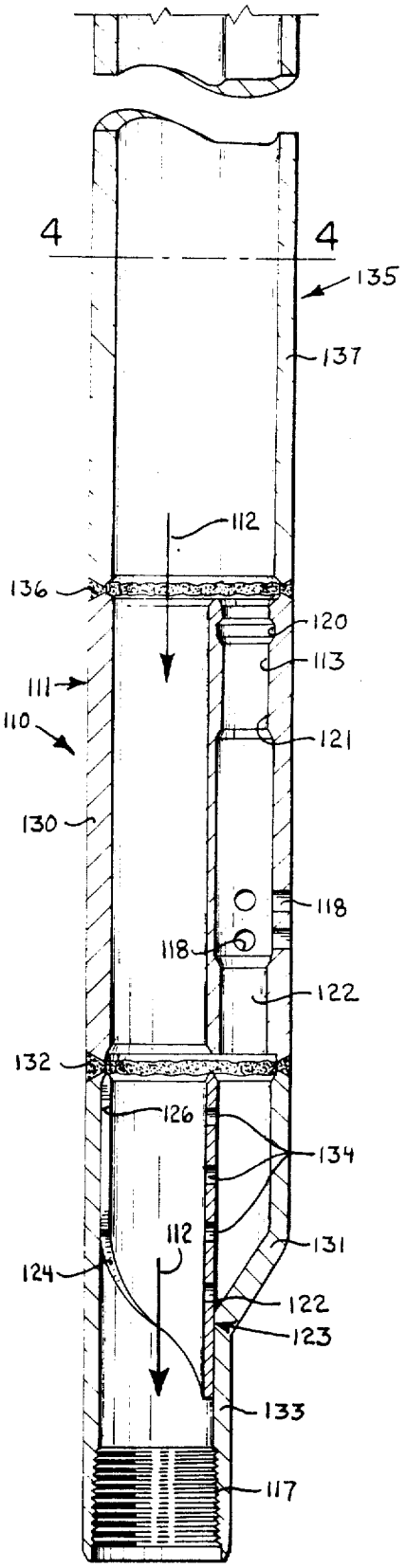

FIGS. 3A, 3B and 4 illustrate another preferred embodiment of this invention. In these figures there is illustrated a side pocket mandrel generally indicated by the reference numeral 110. Mandrel 110 is similar to the mandrel 10 of FIGS. 1A, 1B and 2, but is for use in wells known as pumpdown wells wherein service operations are carried out through use of conventional through-flowline (TFL) or pumpdown equipment and techniques.

Side pocket mandrel 110 has a body 111 having a [fullopening] *full-opening* main bore or passage 112 therethrough, a receptacle bore 113 alongside the main bore 112, space above the receptacle bore 13 for operating a kickover tool, and means such as threads 116 and 117 at its upper and lower ends, respectively, for attachment to a well tubing string to become a part thereof.

Because pumpdown tools, including pumpdown kickover tools, must pass through flow lines containing bends as sharp as 60-inch radius, long tools, such as kickover tools, are articulated to enable them to flex as they negotiate such 60-inch bends in the well flow conduits. Thus, a pumpdown kickover tool generally differs from that of a wireline kickover tool, and this requires the mandrel to be different, also. Mandrel 110, it will be noticed, has an orienting sleeve 123 surrounding the main flow passage 112 below the receptacle bore and welded in place as at 122. It has a guide surface 124 which is engageable by the orienting key of the pumpdown kickover tool (not shown) (such as that illustrated and described in U.S. Pat. No. 4,103,740 which issued to John H. Yonker on Aug. 1, 1978, or U.S. Pat. No. 4,294,313 which issued to Harry E. Schwegman on Oct. 13, 1981) to guide the key into the orienting slot 125. The slot 125 does not terminate at its upper end in a trip shoulder like the trip shoulder 26 seen in the first embodiment. Instead, it terminates in a cam surface 126 which will cam the orienting key inwardly and help it to pass through the orienting sleeve. Near the upper end of the mandrel 110, a downwardly facing shoulder 127 is provided for activating the pumpdown kickover tool. The trip mechanism is engageable with shoulder 127 while the orienting key is still in orienting slot 125.

Downwardly facing shoulder 127 near the mandrel's upper end is provided by a ring 128 positioned atop shoulder 129 and secured as by welding at 137 as shown.

Mandrel 110 comprises a main body section 130 having a main bore therethrough and a receptacle bore 113 alongside thereof. Lateral ports 118 communicate the receptacle bore with the exterior of the mandrel. A flow control device (not shown) may be placed in receptacle bore 113 with its lock means engaged in lock recess 120, its seals engaged with the bore wall at 121 and 122 above and below ports 118, and its intake port in communication with ports 118 so that this device controls flow through ports 118 and therefore flow between the exterior and the interior of the well tubing at this location.

The main body section 130 is one piece and has means on its lower end for connecting the mandrel to a well tubing string. This means may be in the form of a lower end piece 131 welded to the lower end of the one-piece main body section 130 by a circumferential weld 132 and having its lower end portion reduced in diameter as at 133 and threaded internally at 117.

Orienting sleeve 123 is welded in position in the lower end piece as shown and has lateral ports 134 in the wall thereof which communicate main bore 112 with lateral ports 118 through the lower end of receptacle bore 113.

The upper body section 135 is welded to the upper end of the main body section by a circumferential weld as at 136. Upper body section 135 may include an upper body member 137 of uniform section having an upper end piece 138 attached to its upper end by a circumferential weld 140. Upper end piece 138 is reduced in diameter as at 139 and is threaded internally as at 116.

Upper body member 137 has a bore configured like that of mandrel 10 previously described. It has a main bore 112 therethrough and a longitudinal groove 152 formed in the inner wall of the main bore. Groove 152 is longitudinally aligned with receptacle bore 113 and provides space thereabove for operation of a kickover tool for installing or removing flow control devices in the receptacle bore.

FIG. 4 shows a cross section taken through upper body member at line 4—4 and is identical to the cross section shown in FIG. 2. This is because the upper body member 137 of mandrel 110 is identical to the upper body member 37 of mandrel 10.

Figure 5:
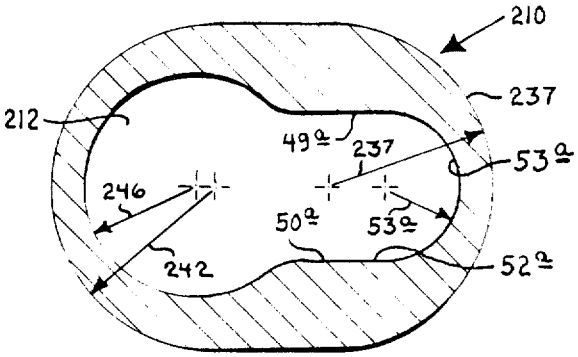
FIG. 5 is a cross-sectional view of enlarged scale similar to FIGS. 2 and 4 but showing a slightly modified form of the invention.

The upper body member of a mandrel of the type illustrated may be produced by any method desired and may have any external shape desired as well as any desired internal configuration which resembles a keyhole. For instance, in FIG. 5 there is illustrated an alternate internal shape. This shape is very similar to the shape illustrated in FIGS. 2 and 4 but shows the bottom wall of the longitudinal groove, that is the groove wall most remote from open bore 12, to be semicircular. Thus, in FIG. 5, the modified mandrel 210 has an upper body member 237 having a main passage 212 therethrough and a longitudinal groove $52^a$ having flat substantially parallel sides $49^a$ and $50^a$ and a bottom $53^a$ which is substantially semicircular. If desired, the width of groove $52^a$ may be less than twice the radius of the semicircular bottom of the groove, in which case the inner wall contour will take on the appearance of the figure "8", but with a portion of each lateral side wall of the slot remaining flat.

Thus, it has been shown that an improved side pocket mandrel has been provided which has superior strength for use at deep depths in deep wells where it would be subjected to high internal or external pressure forces which would tend to burst or collapse it; that it fulfills all of the objects of the invention set forth hereinabove; that this new and improved side pocket mandrel has a portion thereof above its receptacle which is of uniform section throughout its length; that this portion of uniform section provides a main passage therethrough and a longitudinal groove in the internal wall of the passage, this groove being in longitudinal alignment with and extending above the receptacle and providing space thereabove for operation of a kickover tool; that such groove is narrower than the main passage; that the narrowness of this groove provides for thickening of the mandrel wall adjacent thereto to strengthen the wall and enable it to withstand greater forces acting thereagainst, either from interior or exterior thereof; that the groove due to its narrowness shields the offset receptacle bore against larger, unwanted tools lodging atop thereof, yet is sufficiently wide to provide ample space for kickover tools to operate therein to install devices in the receptacle bore or to remove such devices therefrom; that the area of uniform cross section can be round, oval, ovoid or other suitable shape on the outside and with a bore of generally keyhole section; that such bore can be machined if desired, or the portion of uniform section can be produced as by extruding or other suitable process or means, that the side pocket mandrel can be structured for use with either conventional wireline or pumpdown equipment or techniques; and that such mandrels can be constructed without the use of longitudinal structural welds or structural plug welds, both of which have been a source of frequent mandrel failures in the past.

The foregoing description and drawings of the invention are explanatory and illustrative thereof, and various changes in sizes, shapes, materials and arrangements of parts, as well as certain details of construction, may be made within the scope of the appended claims without departing from the true spirit of the invention.

We claim:

1. A side pocket mandrel, comprising:

a. a one-piece main body section having i. a main bore therethrough, ii. a receptacle bore alongside said main bore, iii. port means communicating said receptacle bore with the exterior of said main body section, and iv. means on its lower end for attachment to a well tubing string; and b. an upper body section welded to the upper end of said main body section by a circumferential weld, said upper body section having i. connecting means at its upper end providing a reduced diameter portion adapted for connecting the upper body section to a well tubing string, ii. a main passage through said upper body section including said connecting means in alignment with the main bore of said main body section, and iii. a longitudinal groove in the inner wall of said main passage extending upwardly from said receptacle bore substantially to said upper reduced diameter portion and providing space above said receptable bore for operation of a kickover tool for inserting a flow control device therein, the upper body wall, surrounding said main bore and said groove, being thicker on either side of said groove and tapering in thickness toward opposed locations on a transverse plane where the [axis] *plane* of symmetry passes through the wall section.

2. The side pocket mandrel of claim 1 wherein said upper body section comprises:

a. a one-piece tubular member of uniform cross section; and b. an upper end piece welded to the upper end of said tubular member by a circumferential weld and having a reduced upper end portion having a bore aligned with said main passage and having means at its upper end for attachment to a well tubing string.

3. The side pocket mandrel of claim 2 wherein said groove is at least as wide as said receptacle bore but narrower than said main passage.

4. The side pocket mandrel of claim 3 wherein the opposite walls of said groove are flat and are parallel to each other.

5. The side pocket mandrel of claim 4 wherein the width of said groove approximates its depth.

6. The side pocket mandrel of claim 4 wherein said groove is formed with its depth exceeding its width.

7. The side pocket mandrel of claim 3 wherein said groove is formed with its bottom surface concave.

8. The side pocket mandrel of claim 1, 2, 3, 4, 5, 6 or 7, including: orienting means in said mandrel above said groove and engageable by a kickover tool for orienting said kickover tool relative to said receptacle bore for inserting a flow control device therein.

9. The side pocket mandrel of claim 1, 2, 3, 4, 5, 6 or 7, including:

a. orienting means in said mandrel below the upper end of said receptacle bore and engageable by a kickover tool to orient said kickover tool relative to said receptacle bore for inserting a flow control device therein; and b. shoulder means in said mandrel above said groove and engageable by a kickover tool for activating said kickover tool.

*10. The side pocket mandrel of claim 8 wherein that portion of said mandrel body having the longitudinally extending groove therein is an extruded tube.*

*11. The side pocket mandrel of claim 9 wherein that portion of said mandrel body having the longitudinally extending groove therein is an extruded tube.*

*12. A side pocket mandrel, comprising:*

*a. an elongate body connectable in a well tubing string and having a main bore therethrough, said elongate body comprising*

*i. a main body portion having a main bore therethrough, a receptacle bore extending alongside said main bore, means communicating said receptacle bore with the exterior of said elongate body, and means at its lower end for attachment to a well tubing; and*

*ii. an upper body portion having means at its upper end for attachment to a well tubing, a main bore therethrough continuous with the main bore through the main body portion, and a longitudinal groove in the inner wall of said main bore extending upwardly from said receptacle bore of said main body portion substantially to said attachment means for providing space above said receptacle bore for operation of a kickover tool for inserting a flow control device therein, said groove being at least as wide as said receptacle bore but narrower than said main bore, the body wall at said longitudinal groove being thicker on either side of said*

*groove and tapering in thickness toward opposed locations on a transverse plane where the plane of symmetry passes through the wall section.*

*13. The side pocket mandrel of claim 12 wherein said groove is formed with its bottom surface concave.*

*14. The side pocket mandrel of claim 12 wherein the opposite walls of said groove are flat and are parallel to each other.*

*15. The side pocket mandrel of claim 14 wherein the width of said groove approximates its depth.*

*16. The side pocket mandrel of claim 14 wherein said groove is formed with its depth exceeding its width.*

*17. The side pocket mandrel of claim 12, 14, 15, 16, or 13, including: orienting means in said mandrel body above said groove and engageable by a kickover tool for orienting said kickover tool relative to said receptacle bore for inserting a flow control device therein.*

*18. The side pocket mandrel of claim 17 wherein that portion of the said mandrel body having the longitudinally extending groove therein is an extruded tube.*

*19. The side pocket mandrel of claim 12, 14, 15, 16, or 13, including:*

*a. orienting means in said mandrel body below the upper end of said receptacle bore and engageable by a kickover tool to orient said kickover tool relative to said receptacle bore for inserting a flow control device therein; and*

*b. shoulder means in said mandrel body above said groove and engageable by a kickover tool for activating said kickover tool.*

*20. The side pocket mandrel of claim 19 wherein that portion of the said mandrel body having the longitudinally extending groove therein is an extruded tube.*

* * * * *